US008634155B2

(12) United States Patent
Yasumori et al.

(10) Patent No.: US 8,634,155 B2
(45) Date of Patent: Jan. 21, 2014

(54) THERMALLY ASSISTED MAGNETIC RECORDING DISK WITH ION-IMPLANT FACILITATED NON-MAGNETIC REGIONS, MANUFACTURING METHOD THEREOF, AND MAGNETIC RECORDING METHOD

(75) Inventors: Junichi Yasumori, Tokyo (JP); Yoshiaki Sonobe, Tokyo (JP)

(73) Assignee: WD Media (Singapore) Pte. Ltd., Singapore (SG)

( * ) Notice: Subject to any disclaimer, the term of this patent is extended or adjusted under 35 U.S.C. 154(b) by 195 days.

(21) Appl. No.: 13/074,529

(22) Filed: Mar. 29, 2011

(65) Prior Publication Data

US 2012/0075740 A1    Mar. 29, 2012

(30) Foreign Application Priority Data

Mar. 31, 2010 (JP) .................................. 2010-083553

(51) Int. Cl.
*G11B 5/02* (2006.01)
*G11B 5/82* (2006.01)
*G11B 5/716* (2006.01)

(52) U.S. Cl.
USPC ........................... 360/59; 360/135; 428/839.6

(58) Field of Classification Search
None
See application file for complete search history.

(56) References Cited

U.S. PATENT DOCUMENTS

| 6,751,035 B1* | 6/2004 | Belser .............................. 360/48 |
| 2009/0231746 A1* | 9/2009 | Kaizu et al. ..................... 360/59 |
| 2009/0316297 A1* | 12/2009 | Lee et al. ................... 360/77.05 |

FOREIGN PATENT DOCUMENTS

| JP | 2002-117502 | 4/2002 |
| JP | 2006-260620 | 9/2006 |
| JP | 2007-134004 | 5/2007 |
| JP | 2008-226428 | 9/2008 |

* cited by examiner

Primary Examiner — Daniell L Negron

(57) ABSTRACT

The invention provides a magnetic disk that solves (1) a problem of cross-talk that cannot be solved even by an existing thermally assisted recording method or a discrete method (DTM or the like), (2) a problem of surface flatness, which an existing embedding type DTM or the like has, and (3) a problem of a difference in thermal expansion coefficient between materials when a thermally assisted method is applied to the DTM, and that (4) does not necessitate a special medium structure, and is excellent in a surface flatness and economically and functionally high in realizability. A DTM manufactured by ion implantation is excellent in the surface flatness, and can solve the cross-talk problem by conducting the thermally assisted recording at a temperature between a Curie temperature (Tcn) of a portion where ions are implanted (non-recording region) and a Curie temperature (Tcr) of a portion where ions are not implanted (recording region).

15 Claims, 10 Drawing Sheets

FIG. 1
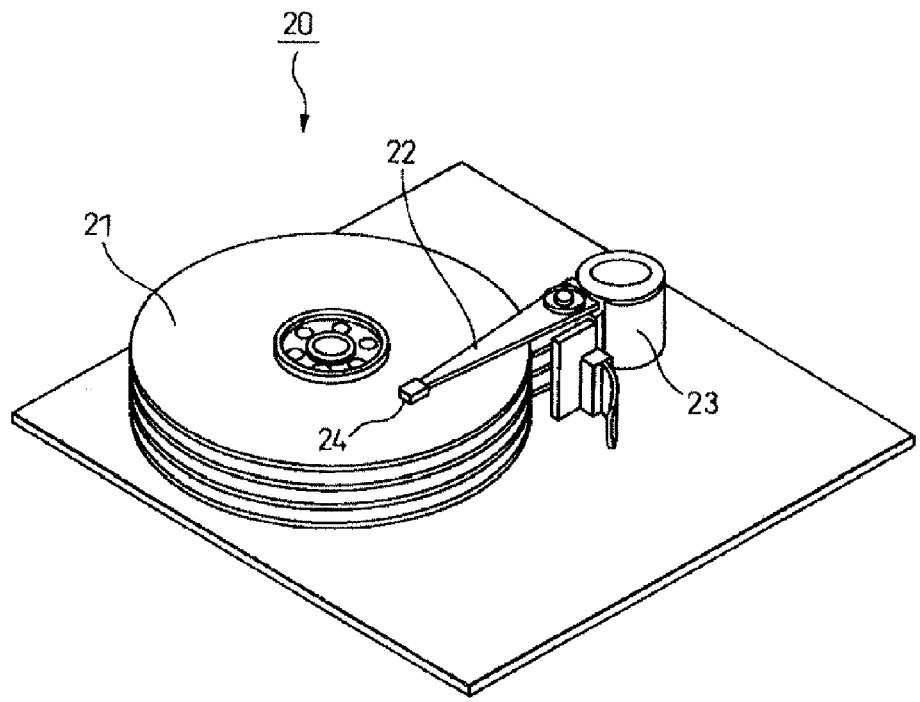
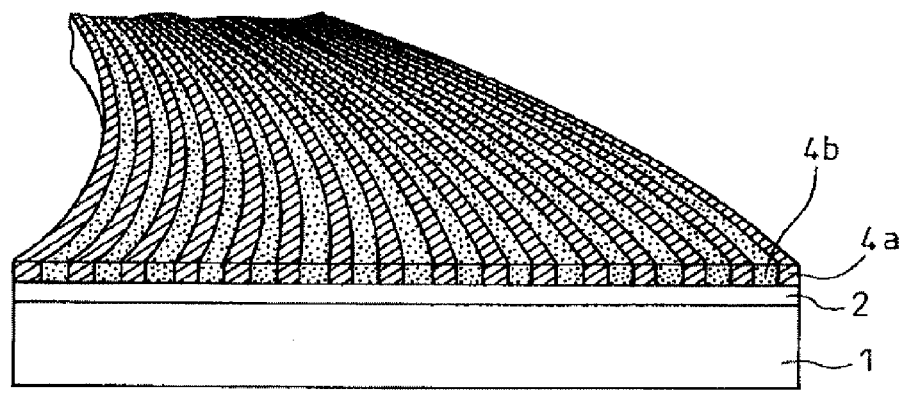

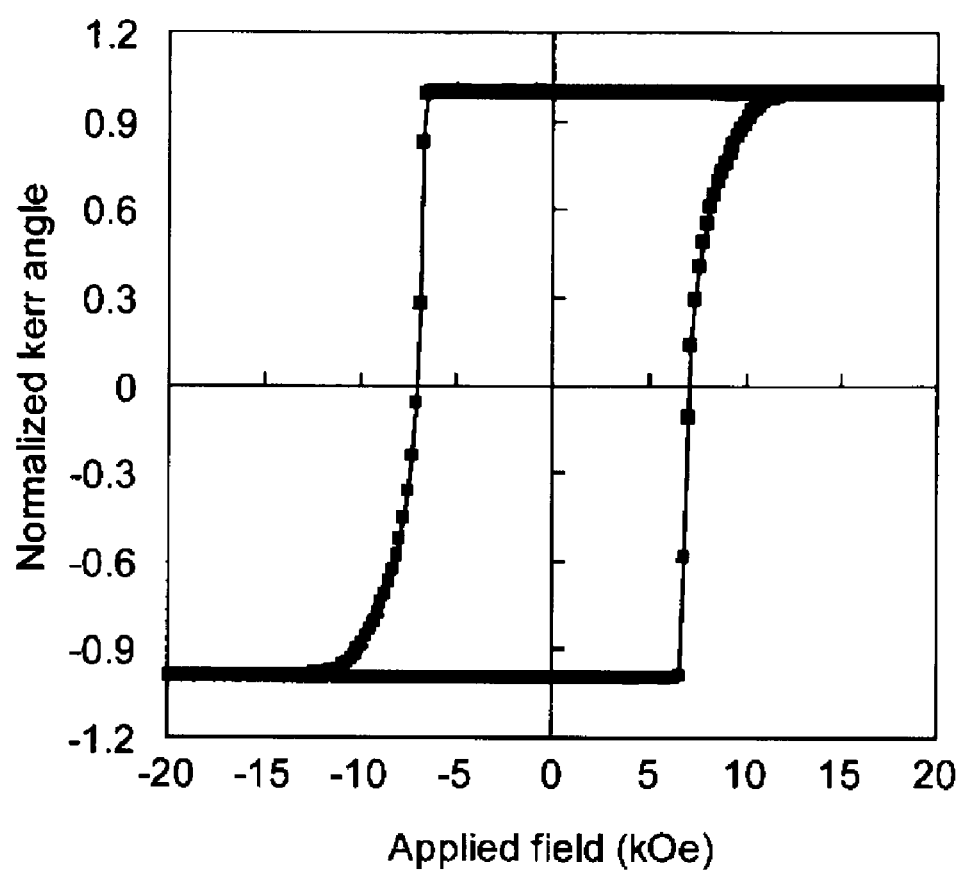

THERMALLY ASSISTED MAGNETIC RECORDING DISK WITH ION-IMPLANT FACILITATED NON-MAGNETIC REGIONS, MANUFACTURING METHOD THEREOF, AND MAGNETIC RECORDING METHOD

BACKGROUND

1. Field of the Invention

The present invention relates to a magnetic disk that utilizes a thermally assisted method during magnetic recording in a magnetic recording apparatus.

2. Description of the Related Art

As a digital information technology develops, high capacity of a recording apparatus and miniaturization and light weight of an apparatus are in demand. In order to respond to the demand, in a magnetic recording apparatus, in particular, a magnetic disk recording apparatus (for example, Hard Disk Drive (HDD)), a high recording density is being pursued. In recent years, developments and researches for achieving a surface recording density of 1 Tb/in$^2$ or more are under way.

The high recording densification of a magnetic disk recording apparatus has been realized by miniaturizing a dimension of a recording bit. However, as the recording bit is miniaturized, there occurs a problem that a thermal fluctuation phenomenon where the magnetization is destabilized owing to thermal energy remarkably appears and thereby recorded information is lost. In order that the recorded information is recorded for a practical period, it is required to increase a volume of a magnetic particle constituting the recording bit that is the minimum unit of information in an information recording medium or to increase its coercive force. When the miniaturization is forwarded, since there is a limit to increase a volume of the magnetic particle, it becomes necessary to increase the coercive force of the magnetic particle.

However, when the coercive force of a magnetic body is immoderately increased, a recording medium is not sufficiently magnetized and is incapable of effecting saturation recording in writing information under a magnetic field generated by a magnetic head; accordingly, there occurs a problem that the over-write characteristics are deteriorated, which is a fatal problem for the magnetic recording medium.

In order to solve the problem, a thermally assisted recording method has been proposed as a countermeasure during the magnetic recording.

The thermally assisted recording method is a recording method where a magnetic body that is a recording medium is locally heated during writing-in of information to lower the coercive force to magnetize the magnetic body by a magnetic field of a magnetic head to record. As a method of heating a magnetic body that is a recording medium, a thermally assisted magnetic recording head where the recording medium is heated by illuminating with laser light has been disclosed (for example, Japanese Patent Application Laid-Open No. 2002-117502). According to the thermally assisted recording method, a bit recording density per one track (circumferential direction) (Bit Per Inch: BPI) is increased to increase the surface recording density.

On the other hand, in a discrete track medium, a non-recording region that magnetically separates is disposed between adjacent magnetic recording regions for recording to inhibit the adjacent magnetic recording portions from interfering with each other. Thereby, a track density (TPI) in a radial direction can be increased. Furthermore, as a medium analogous to a discrete track medium (DTM) where a magnetic recording region and a non-recording region are disposed in parallel in track, there is a bit patterned medium (BPM) obtained by, while a magnetic recording region and a non-recording region are adjacently disposed, artificially and regularly disposing a non-recording region also between the recording bits (for example, Japanese Patent Application Laid-Open No. 2008-226428).

The surface recording density of a magnetic disk is determined by a product of the BPI and the TPI.

SUMMARY OF THE INVENTION

A demand for high densification of a magnetic disk becomes stronger year after year; accordingly, it is more and more necessary to increase the coercive force of a magnetic body. However, when a material that is more than ever high in the coercive force and large in magnetic anisotropy is used in a magnetic recording portion, there occurs a problem of a limit of a recording magnetic field of the head. In this connection, a thermally assisted magnetic recording method where, only during recording, the coercive force of a recording medium is thermally lowered is necessary. In the thermally assisted recording, since an intrinsic coercive force of the magnetic medium is high, it is necessary to lower the coercive force under high temperatures to magnetically record. However, owing to the heat distribution, the magnetic body becomes instable to cause a problem that, during writing-in of information, a so-called cross-talk phenomenon where information of an adjacent track that is not wanted to record is rewritten occurs to inhibit increasing of the TPI.

In order to solve the problem, a method where a material having high thermal conductivity is disposed at a lower layer of a magnetic recording portion has been proposed (for example, Japanese Patent Application Laid-Open No. 2006-260620). However, according to the method, there is no physical countermeasure to a boundary region with an adjacent track; accordingly, there is a limit in inhibiting the cross-talk from occurring and a requirement for high densification cannot be met. There is a further disadvantage that a magnetic disk structure is complicated to increase a manufacturing cost.

On the other hand, in a magnetic disk (hereinafter, referred to as "DTM or the like") such as a discrete track medium (DTM) or a bit patterned medium (BPM), a non-magnetic material is intervened in a non-recording portion between tracks to suppress the noise due to interference between tracks. This can be said a physical countermeasure to a boundary region between tracks. However, in order to bury the non-magnetic material in the non-recording portion, a complicated process has to be undergone; accordingly, there is a problem from the economical point of view.

That is, problems that have to be solved by the invention are (1) to solve the problem of the cross-talk that cannot be solved even by an existing thermally assisted recording method or a discrete method (DTM or the like) to achieve high magnetic recording densification, and (2) to provide a magnetic disk that does not necessitate a special medium structure and is convenient more than ever in the manufacturing method, excellent in the surface flatness, and high in realizability from the economical and functional viewpoint.

According to an existing discrete method, for example, a discrete method where a part of a general magnetic recording layer is physically removed, followed by burying a nonmagnetic material therein, flattening is difficult, and thus, a levitation amount of a head cannot be sufficiently lowered. When the levitation amount is forcibly lowered, not only the endurance is deteriorated (tend to cause head crush), but also a manufacturing process becomes complicated to result in a large increase in the cost.

Furthermore, according to an existing discrete track medium where a glove is dug and a non-magnetic material is buried therein, a magnetic material and a nonmagnetic material are different from each other; accordingly, there is a difference in thermal expansion coefficient between materials. Accordingly, when a temperature goes up during the thermally assisted recording, there is a concern of generating a step between the nonmagnetic material and the magnetic material. When the step is generated, in a HDD that uses a levitation head, the reliability thereof is unfavorably and remarkably deteriorated.

In the case of the DTM generated by ion implantation or the like, a step of burying the nonmagnetic material is not necessary, and the DTM can be obtained without undergoing a complicated process. Accordingly, the present inventors considered that, by combining the DTM owing to ion implantation and the thermally assisted recording, high density magnetic recording can be realized also from the viewpoint of economic efficiency and functionality, and studied.

As the result thereof, the present inventors found that, when, in the DTM owing to the ion implantation or the like, by making use of a phenomenon that ferromagnetism of a material of a portion where ions were implanted deteriorates compared with ferromagnetism of a material of a portion where ions were not implanted, and a Curie temperature (Tc) where the coercive force becomes zero becomes lower than the Curie temperature of a portion that was not implanted with ions, magnetic recording is conducted at a temperature between these Curie temperatures, thereby the cross-talk can be effectively prevented. Thereby, the invention was completed. Summaries of the invention are as follows.

(1) A thermally assisted magnetic recording disk that includes, on at least one surface of a substrate, a magnetic recording layer in which a magnetic recording region for conducting read/write of magnetic information and a non-recording region for magnetically separating the magnetic recording region are regularly disposed in an in-plane direction of the substrate; and, in the non-recording region, one or more kinds of elements of B, P, Si, F, C, In, Bi, Kr, Ar, Xe, W, As, Ge, Mo, Sn, $N_2$, $O_2$, Ne, He and $H_2$, wherein a thermally assisted recording method is used to record.

(2) The thermally assisted magnetic recording disk of the (1), wherein one or more kinds of elements of B, P, Si, F, C, In, Bi, Kr, Ar, Xe, W, As, Ge, Mo, Sn, $N_2$, $O_2$, Ne, He and $H_2$ contained in the non-recording region are elements implanted by ion illumination.

(3) A thermally assisted magnetic recording disk that includes, on at least one surface of a substrate, a magnetic recording layer in which a magnetic recording region for conducting read/write of magnetic information and a non-recording region for magnetically separating the magnetic recording region are regularly disposed in an in-plane direction of the substrate; and, in the non-recording region, one or more kinds of elements of B, P, Si, F, C, In, Bi, Kr, Ar, Xe, W, As, Ge, Mo, Sn, $N_2$, $O_2$, Ne, He and $H_2$, wherein a Curie temperature (Tcn) of the non-recording region and a Curie temperature (Tcr) of the recording region satisfy a relationship of Tcn<Tcr.

It goes without saying that also the magnetic disk may be recorded according to a thermally assisted recording method.

Furthermore, one or more kinds of elements of B, P, Si, F, C, In, Bi, Kr, Ar, Xe, W, As, Ge, Mo, Sn, $N_2$, $O_2$, Ne, He and $H_2$, which are contained in the non-recording region, may be elements implanted by ion illumination.

(4) The thermally assisted magnetic recording disk of any one of the (1) to (3), wherein a magnetic anisotropy constant in the magnetic recording region is $5 \times 10^6$ or more.

(5) The thermally assisted magnetic recording disk of any one of the (1) to (4), wherein the magnetic recording layer contains an FePt alloy layer.

(6) A method of manufacturing the thermally assisted magnetic recording disk of any one of the (1) to (5) including a pattern forming process for forming a region where illuminated ions are contained and a region where ions are not contained by, after depositing a magnetic recording layer having the magnetic anisotropy constant of at least $5 \times 10^6$ or more on a substrate, masking a predetermined portion in an upper portion of the magnetic recording layer and illuminating ions.

(7) A magnetic recording method onto the thermally assisted magnetic recording disk of any one of the (1) to (5), wherein the Curie temperature (Tcn) of the non-recording region, the Curie temperature (Tcr) of the recording region, and a magnetic recording temperature (Tr) that is a temperature during magnetic recording satisfy a relationship of Tcn≤Tr<Tcr.

According to the invention, not only magnetic recording free from the cross-talk is realized but also a manufacturing method of a discrete track medium (DTM) by using an ion implantation method can be applied; accordingly, a thermally assisted magnetic recording disk excellent in both economic efficiency and functionality can be obtained. Thereby, high recording densification of the magnetic disk can be achieved.

BRIEF DESCRIPTION OF THE DRAWINGS

FIG. 1 is a diagram illustrating a conceptual diagram of a hard disk drive (HDD) and a discrete track medium;

FIG. 1A is a conceptual diagram of the HDD;

FIG. 1B is a conceptual diagram of the discrete track medium;

FIG. 6 is a diagram illustrating a magnetization curve before ion implantation in an example of the invention;

DETAILED DESCRIPTION OF THE PREFERRED EMBODIMENTS

In the magnetic recording disk such as DTM according to the invention, among the magnetic recording layer thereof, only the non-recording region that magnetically separates the magnetic recording region is made low in Hc by an ion implantation method (also called an ion illuminating method), and only a portion necessary in information recording is heated by a thermally assisted magnetic recording method to magnetically record the information. The principle thereof will be described. In the invention, according to the ion implantation method, the Hc only needs to be lowered to an extent by which an effect of the invention can be obtained. That is, only semi-hard magnetization, soft magnetization or weak magnetization needs to be applied.

Figure 2:
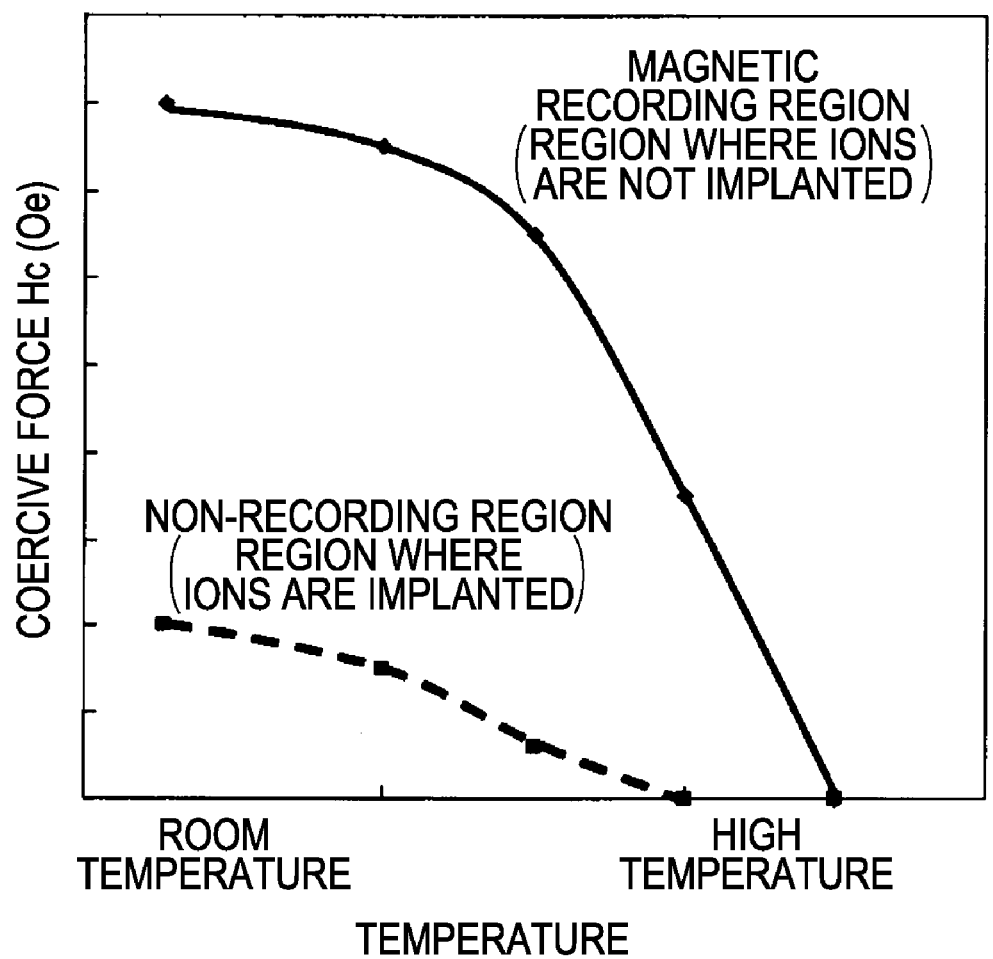
FIG. 2 is a conceptual diagram illustrating a relationship between a coercive force and a temperature of a magnetic recording region (a region where ions are not implanted) and a non-recording region (a region where ions are implanted)

In general, a value of the coercive force (Hc) of a magnetic material that exhibits ferromagnetism decreases as the temperature goes up (FIG. 2). Furthermore, in the ion-implanted portion (non-recording region), the coercive force becomes smaller in comparison with the portion that is not ion-implanted (magnetic recording region) (FIG. 2).

As the result thereof, when compared based on a temperature (Curie temperature) where the coercive force (Hc) becomes zero, the Curie temperature (Tcn) of an ion-implanted portion becomes lower than the Curie temperature (Tcr) of a portion where ions are not implanted (FIG. 2).

The invention makes use of the phenomenon, and, to a magnetic disk having the above-mentioned structure, a temperature during magnetic recording (Tr) is set to a temperature between the Curie temperatures of these regions.

Figure 3:
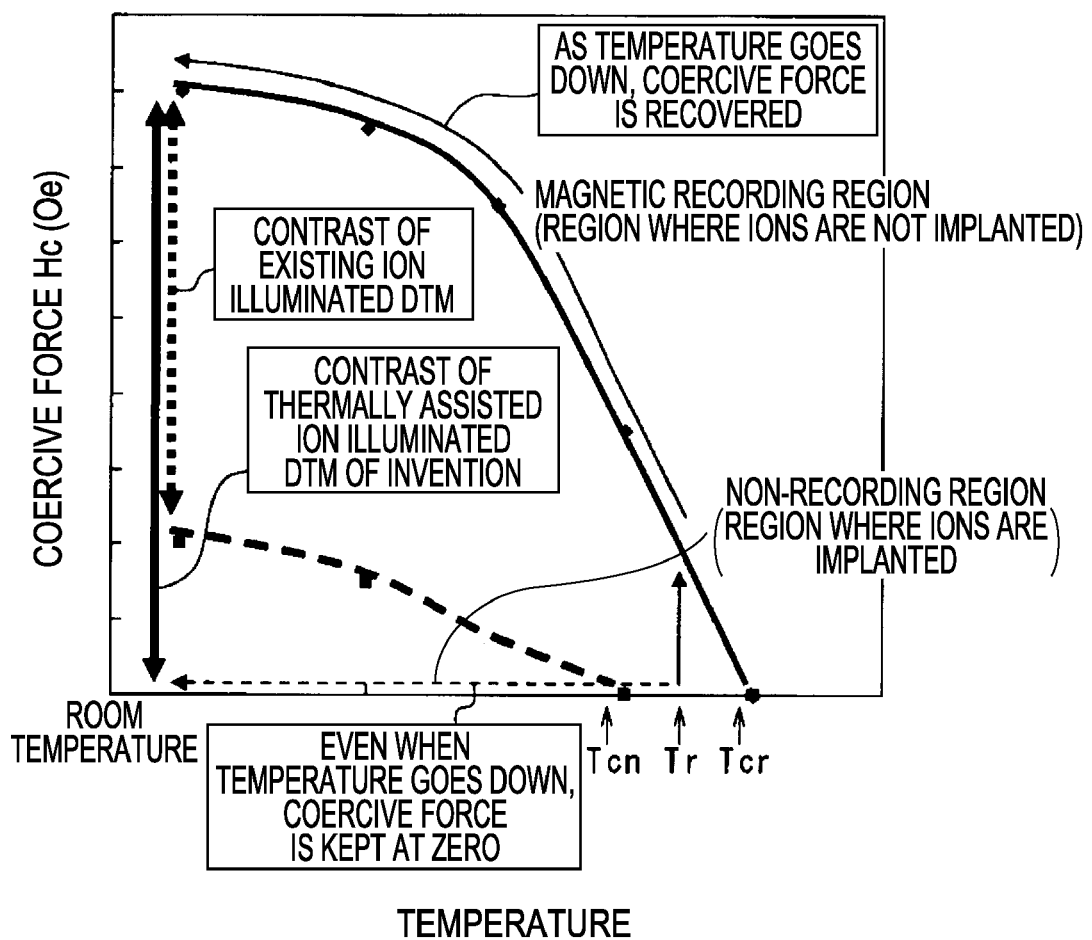
FIG. 3 is a conceptual diagram describing the invention from a relationship between the coercive force and the temperature of the magnetic recording region (a region where ions are not implanted) and the non-recording region (a region where ions are implanted)

When the temperature is set in the region, although the portion where ions are not implanted (magnetic recording region) is ferromagnetic, the portion where ions are implanted (non-recording region) exhibits paramagnetism. Accordingly, the non-recording region, even when a magnetic field is applied with a magnetic recording head, can not be recorded since there is no residual magnetization because of paramagnetism. Accordingly, even when a temperature decreases, the magnetization is maintained at zero (FIG. 3).

On the other hand, the magnetic recording region is ferromagnetic even at the temperature (Tr) during magnetic recording; accordingly, when a magnetic field of the magnetic recording head is applied, the magnetic recording region is magnetized in a direction of the recording magnetic field to generate residual magnetization. Then, as the temperature goes down, the coercive force is recovered to be large (FIG. 3). As the result thereof, in the magnetic recording region, recording signals remain strong, and the recording signal does not at all remain in an adjacent non-recording region. Accordingly, a magnetic contrast between both regions becomes strong, remarkably improving accuracy during information reading.

For example, when an FePt ordered alloy is used as a material of the magnetic recording layer, the Curie temperature (Tcr) in a state after crystal growth is about 300° C. On the other hand, when nitrogen ($N_2$) ions are implanted at ion illumination energy of 1 to 50 KeV and a dose amount of 1E13 to 1E17 atoms/cm$^2$, the Curie temperature (Tcn) is lowered to about 100° C. Accordingly, when the magnetic recording is conducted at a temperature between Curie temperatures of the both regions, high contrast recording can be applied.

When the dose amount is too much, the difference between compositions of a magnetic material of the recording region and an ion-illuminated material of the non-recording region becomes large to be likely to generate a difference of thermal expansion coefficient. Accordingly, it is considered that there is a limit at a certain level of illumination amount.

In the magnetic recording to the DTM or the like according to existing ion illumination, the difference in the coercive force at room temperature between the magnetic recording region (region where ions are not implanted) and the non-recording region of which Hc is lowered (region where ions are implanted) generates magnetic contrast (FIG. 3).

Furthermore, according to an existing (Is a medium having no non-recording region between tracks used?) thermally assisted magnetic recording method, the spot heating is applied only to about 200° C. In other words, the magnetic recording temperature (Tr) is about 200° C. at the very most. This is a temperature of the Tc or less of a general magnetic material; accordingly, the magnetic recording region and the non-recording region are magnetized while maintaining ferromagnetism. Accordingly, in the non-recording region, residual magnetization remains, and, upon returning to room temperature, the coercive force is recovered along a curve of FIG. 3 so that information is recorded in the non-recording region that is not fundamentally desirable to record information, which results in insufficient separation between tracks and bits in the non-recording region. As the result thereof, the difference in coercive force between the both regions at room temperature becomes smaller than the difference in coercive force owing to the invention to result in smaller magnetic contrast (FIG. 3).

Accordingly, it is found that the magnetic disk according to the invention can conduct magnetic recording with high contrast.

Although described also in a problem to be solved, in order to achieve high densification of the magnetic disk, it is important to narrow a region for recording one piece of information (one bit recording region). In order to realize this without deteriorating the SNR, a magnetic particle that is the minimum unit constituting each bit has to be made smaller, and, in order to inhibit the resultant problem of thermal fluctuation from occurring, the coercive force is necessarily made larger. In order to make the coercive force larger, an anisotropic magnetic field (Hk) may be made larger, and, this may be achieved by making the magnetic anisotropy constant (Ku) higher. Specifically, recording on a material of which Ku is $5 \times 10^6$ or more is very difficult because a recording head magnetic field is finite under a temperature atmosphere of a room temperature level. Accordingly, a recording method according to the thermally assisted recording method is considered indispensable and, in order to achieve high recording densification by eliminating an influence of the cross-talk, tracks have to be clearly separated therebetween; accordingly, a magnetic recording method capable of separating the tracks with high magnetic contrast like the invention is in demand.

In the next place, a manufacturing method of a magnetic disk according to the invention will be described.

Figure 4:
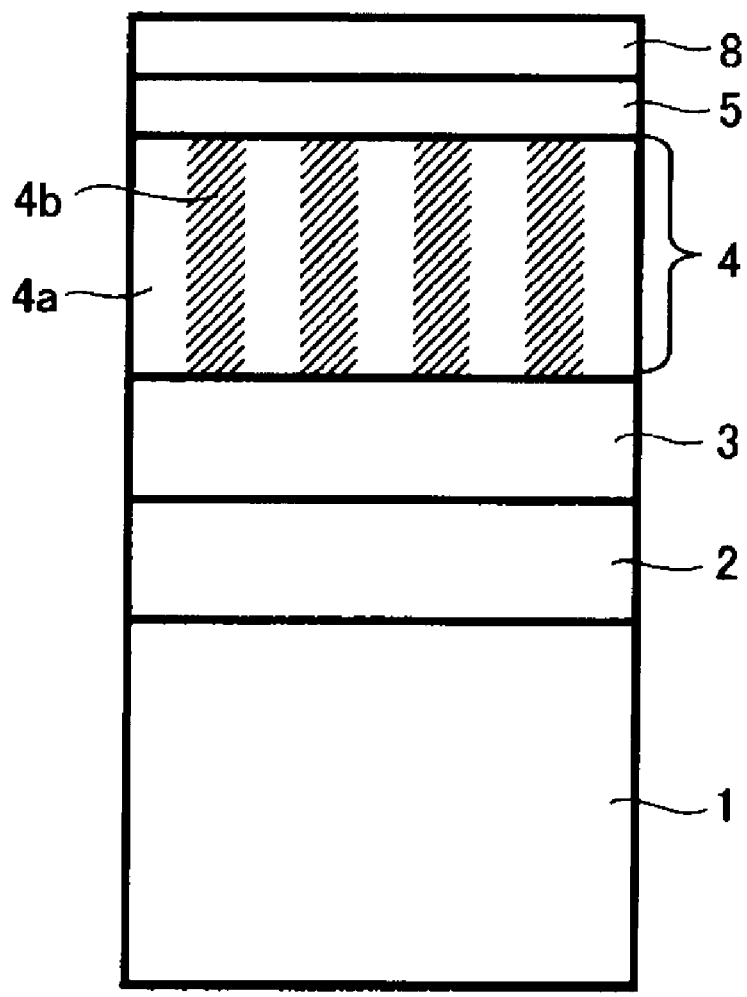
FIG. 4 is a conceptual diagram illustrating a structure of a magnetic disk according to the invention.

A magnetic disk is generally constituted by stacking, on a disc-like substrate 1 made of a non-magnetic material, a soft magnetic layer (SUL: Soft Under Layer) 2, an intermediate layer 3, a magnetic recording layer 4, a protective layer 5 and a lubrication layer 8 in this order (FIG. 4). The respective layers of the magnetic recording layer 4 and thereunder are also sub-divided into several layers. However, in the invention, the sub-divided layer structures are not questioned. These respective layers are prepared by depositing materials necessary for the respective layers according to a CVD method, a PVD method, a magnetron sputtering method, or the like.

As a nonmagnetic substrate material 1, usually, glass or aluminum is used. A material of the glass substrate is not particularly questioned. Examples thereof include aluminosilicate glass, soda-lime glass, soda aluminosilicate glass, aluminoborosilicate glass, borosilicate glass, quartz glass, chain silicate glass, or glass ceramics such as crystallized glass. These glass or aluminum is, after processing into a disc, followed by surface polishing, further followed by such a process as chemically strengthening in the case of glass, used as a nonmagnetic substrate.

The soft magnetic layer 2 is, in a vertical magnetic recording method, a layer for forming a magnetic circuit temporarily during recording to pass a magnetic flux in a vertical direction to the magnetic recording layer. Examples of materials for the magnetic layer include cobalt base alloys such as CoTaZr, Co—Fe base alloys such as CoFeTaZr and CoCr-FeB, and Fe base alloys such as FeTaC and FeTaN.

The intermediate layer 3 is a layer that shields an interference action of materials of the soft magnetic layer 2 of a lower layer and the magnetic recording layer 4 of an upper layer. Furthermore, the intermediate layer 3 has a function that can be compared to a basis that controls a particle size, a particle size dispersion and a crystal orientation of the magnetic recording layer of the upper layer. It is preferable to divide the intermediate layer into two layers of a top layer and a bottom layer in simultaneously controlling the crystal orientation and the particle size of the magnetic recording layer. For example, in the bottom layer of the intermediate layer, metal simple body such as Ni, Cu, Pt, Pd, Zr, Hf or Nb, or alloys obtained by adding W, Cr, V, Ta or Mo thereto can be used. On the other hand, in the top layer of the intermediate layer, in order to control the crystal orientation of the magnetic recording layer, for example, Hcp or fcc crystal materials such as Ru, Re, Pd, Pt, Fe and Au, or alloys such as RuCr and RuCo can be used. In particular, Ru is close in a lattice constant to Co that is a main component of a magnetic particle of the magnetic recording layer and also a crystal structure thereof is a hcp structure the same as Co; accordingly, Ru is effective in improving the crystal orientation of Co. Furthermore, it is important also to use a material in accordance with a composition of the upper portion of the magnetic layer. For example, when an FePt alloy is used as the magnetic layer, an MgO base material may also be used.

The magnetic recording layer 4 is a site that records information, which is a main function of a patterned medium. In the case of a generally accepted vertical recording method, a magnetic particle of a ferromagnetic body having a columnar structure is preferably formed into a granular structure surrounded by a grain boundary made of a nonmagnetic material. Examples of materials of the magnetic recording layer include composite materials obtained by adding oxides to Co base alloys, Fe base alloys and Ni base alloys. When the material is deposited on the intermediate layer and epitaxially grown, a columnar granular structure can be favorably obtained. Furthermore, other than the foregoing composite materials, so-called ordered lattice materials that are obtained as materials having high magnetic anisotropy by forming FePt alloys and CoPt alloys into an ordered lattice, and also magnetic materials obtained by adding an additive element thereto to lower the Tc to use in the thermally assisted recording can be used. Furthermore, also a so-called artificial lattice film having an interface magnetic anisotropy such as Co/Pt multi-layered film that exhibits high magnetic anisotropy can be used.

FIG. 5 illustrates an outline of an example of a manufacturing method.

Figure 5A:
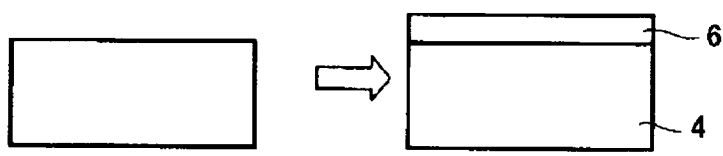
FIG. 5A-5D are conceptual diagrams illustrating a method of manufacturing the magnetic disk according to the invention.

FIG. 5A illustrates a state where the magnetic recording layer 4 is deposited on at least one surface of a substrate (FIG. 5 depicts only a magnetic recording layer.). As was described above, the magnetic recording layer 4 are formed by stacking layers of various materials and has a thickness of about 5 nm to 30 nm as a total thickness. In each drawing of FIG. 5, boundaries of the stacked respective layers are not shown.

In the next place, a resist 6 is coated on the magnetic recording layer 4. A peel layer (not shown in the drawing) maybe deposited between the magnetic recording layer 4 and the resist 6. As the peel layer, for example, diamond-like carbon can be used and a thickness of about 1 to 5 nm is preferred. The diamond-like carbon can be deposited by, for example, a CVD method.

As the resist 6, a resist appropriate for a patterning method following thereafter is selected. Herein, a case where a nano-print method is used to print is described as an example. It goes without saying that a patterning method is not restricted to the nano-print method. Also such a method as a lithography method used in semiconductor may be used.

For the nano-imprint, a nano-imprint resist is used. Examples of the nano-imprint resists include a thermal nano-imprint resist, a UV-curing nano-imprint resist and a room temperature nano-imprint resist. Any one thereof may be used. Here, the room temperature nano-imprint resist is used to describe.

The room temperature nano-imprint resist is a liquid material obtained by dissolving a silicon (Si) compound and an additive (a diffusing impurity, a glassy material forming agent, an organic binder and the like) in an organic solvent (alcohol, ester, ketone and the like). Examples thereof include silica glass, a hydrogenated silsesquioxane polymer (HSQ), a hydrogenated alkylsiloxane polymer (HOSP), an alkylsiloxane polymer, an alkylsilsesquioxane polymer (MSQ) and the like and these are called SOG (Spin On Glass). In the step of depositing a resist mask layer, the SOG is coated on the peel layer according to a spin coat method to form a film. A thickness thereof is preferably set to, though depending on the patterning, about 50 to 60 nm.

Figure 5B:
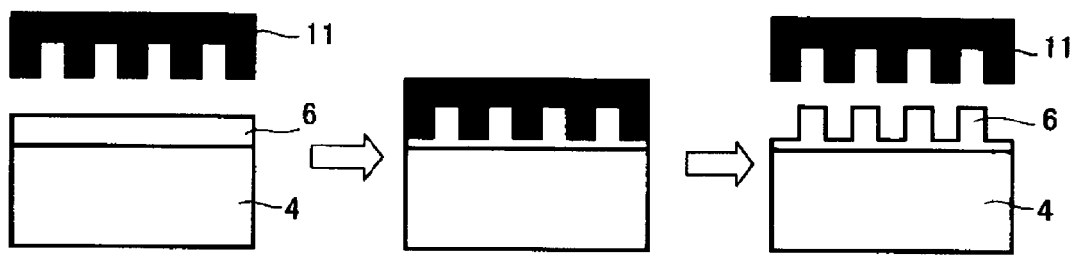

FIG. 5B illustrates patterning. When a stamper 11 is pressed, a magnetic track pattern is transferred (imprinted). The stamper 11 has a concavo-convex pattern corresponding to each pattern of the magnetic recording region to be transferred and the non-recording region, that is, a region where ions are not implanted in the magnetic recording layer with an ion shield (masked) (magnetic recording region) and a region where ions are allowed to go through to implant ions in the magnetic recording layer (non-recording region).

During ion illumination, in a portion that allows ions to go through, a resist mask layer 6 is thinned to be a concave portion of the resist mask layer, and a portion that shields (masks) ions is a convex portion of the resist mask layer. The concavo-convex pattern of the stamper 11 is reverse thereto.

It is desirable that, for example, when the resist is the SOG, an ion to be implanted is any of B, P, Si, F, C, In, Bi, Kr, Ar, Xe, W, As, Ge, Mo, Sn, $N_2$, $O_2$, Ne, He and $H_2$ or composite ions of two or more kinds thereof, the ion illumination energy is 1 to 50 KeV, and a dose amount is 1E13 to 1E17 atoms/$cm^2$, the thickness of a concave portion of the resist mask layer is desirable to be 30 nm or less. Furthermore, at that time, with a thickness of the convex portion of the resist mask layer set to is and a thickness of the concave portion thereof set to tc, a ratio of the thicknesses is desirable to satisfy $2 \leq t\ s/tc \leq 10$. When the thickness of a convex portion of the resist mask layer is, though depending on ion illumination energy, 50 nm or more, without allowing ions to penetrate, a sufficient masking effect can be obtained.

After a pattern of the magnetic recording region is transferred by the stamper 11, the stamper 11 is separated (demolded) from the resist mask layer 6, thereby a desired concavo-convex pattern is formed in the resist mask layer 6. At that time, when a stamper surface is coated with a peeling agent, the stamper can be readily demolded.

Figure 5C:
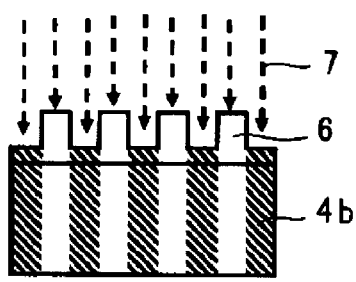

FIG. 5C illustrates a state where ions are illuminated. In the concave portion of the resist mask layer, the resist mask layer is thin; accordingly, ions 7 go through the resist mask layer 6 and are implanted in the magnetic recording layer 4 immediately therebelow.

When the ions 7 are implanted in the magnetic recording layer 4, a crystal structure of an ion-implanted portion of the magnetic recording layer 4 is disturbed to weaken magnetism. Accordingly, in comparison with the magnetic recording layer where ions are not implanted, the magnetism becomes far weak, thereby the non-recording region capable of magnetically separating adjacent magnetic recording layers is formed. Thereby, between magnetic recording regions 4a, as a separating region, a non-recording region 4b is formed. The narrower a width thereof is made, the higher the magnetic recording density becomes.

Ions to be implanted are not particularly restricted. However, usually, one or more ions selected from the group consisting of B, P, Si, F, C, In, Bi, Kr, Ar, Xe, W, As, Ge, Mo, Sn, $N_2$, $O_2$, Ne, He and $H_2$ are implanted. A valence of the all ions is plus monovalent. Among the ions, from the viewpoint of handiness, Ar, $N_2$, $O_2$, Kr, Xe, Ne, He or $H_2$ is preferably used. Furthermore, from the viewpoint of the cost, Ar, $N_2$ or $O_2$ is more preferably used. At that time, when, for example, ion illumination energy is 1 to 50 KeV and a dose amount is 1E13 to 1E17 atoms/$cm^2$, through, the concave portion of the SOG resist mask layer, ions can be implanted in the magnetic recording layer.

Figure 5D:
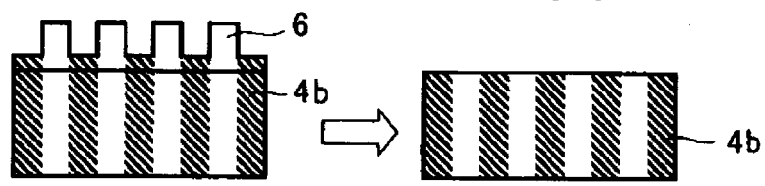

FIG. 5D illustrates a state when the resist mask layer is removed. The resist mask layer can be removed, for example, by wet etching with alkali solvent. Examples of the alkali solvents used in the wet etching usually include a KOH-containing solution and a NaOH-containing solution. However, without particularly restricting thereto, the alkali solvent can be appropriately selected according to the kind of the resist mask. Other than the wet etching, a dry etching process such as RIE (Reactive Ion Etching) or ashing can be used to remove. What is mentioned above is a pattern-forming step.

After that, the protective layer 5 and the lubrication layer 8 are formed. As the protective layer, for example, diamond-like carbon (DLC) can be used and a thickness thereof is preferably about 1 to 5 nm. The diamond-like carbon can be deposited according to, for example, a plasma CVD method. The lubrication layer is obtained by dip-coating PFPE (perfluoropolyether).

By undergoing the foregoing steps, in the magnetic recording layer, the non-recording region containing illuminated ions and the magnetic recording region that does not contain illuminated ions can be formed in accordance with a predetermined pattern.

A method of manufacturing a magnetic disk according to the invention is not restricted to the foregoing method and only needs to be a manufacturing method where the non-recording region that contains ions illuminated by ion illumination and the magnetic recording region that does not contain illuminated ions are formed in accordance with a predetermined pattern.

As a manufacturing method of DTM or the like other than the ion illumination method, there is a method where a physical groove is formed by etching on the non-recording portion of the magnetic recording layer and a nonmagnetic material is buried therein. However, according to the method, not only the steps are complicated, but also an irregularity of a surface tends to be generated and particles tend to be generated; accordingly, stable magnetic head levitation is likely to be disturbed.

On the other hand, according to the ion illumination method, there is neither a step of forming a physical groove nor a step of burying therein; accordingly, without undergoing complicated steps, a flat surface can be maintained. As the result thereof, the magnetic head can be stably levitated. From what was described above, it is considered that, at an ion illumination amount in the Example, the thermal expansion coefficient of the magnetic material hardly varies under ion illumination, thereby, the levitation characteristics of the head was not affected.

In the next place, a method of conducting magnetic recording on a magnetic disk according to the invention will be described.

As was described above, the magnetic recording is conducted at a temperature (magnetic recording temperature (Tr)) between the Curie temperature (Tcr) of the magnetic recording region that does not contain illumination ions and the Curie temperature (Tcr) of the non-recording region containing illumination ions. At that time, only a portion to be magnetically recorded is heated up to the Tr; accordingly, the magnetic recording is preferably conducted by the thermally assisted recording method.

When the thermally assisted recording method is used, the recording can be conducted also to a medium having such high coercive force as cannot be usually recorded by lowering the coercive force only of a portion necessary for recording. There are several spot heating methods. For example, a method illustrated in the Japanese Patent Application Laid-Open No. 2007-134004 is a spot heating method that uses a laser. Furthermore, there is also a method where an electric resistor is disposed in the neighborhood of the recording head. Still furthermore, as the magnetic disk is more densified, a heating spot diameter is demanded to be about 100 nm less than a wavelength of light; accordingly, for example, plasmon heating and a near-field light heating method can be used. Herein, the plasmon heating means light generated, when light is incident on a body (fine aperture or fine particle) having a dimension less than a wavelength, so as to localize in the neighborhood of the body.

EXAMPLES

A nonmagnetic and heat-resistant disk-like glass substrate having a diameter of 65 mm was prepared, and, on the glass substrate, 80Fe-8Ta-12C (100 nm) as a soft magnetic layer, then MgO (20 nm), Fe (1 nm) and Au (40 nm) as an intermediate layer were sputter deposited at room temperature.

Then, the substrate was heated to 300° C., followed by sputter-depositing FePt (15 nm) thereon, further followed by annealing at 500° C. to form an ordered alloy. It was confirmed with X-ray that FePt is formed into an ordered alloy. In FIG. 5A, layers upper than the FePt layer 4 are illustrated.

Furthermore, a carbon film (not shown in the drawing) made of diamond-like carbon was deposited at a thickness of 3 nm according to a CVD method, and thereon a room temperature nano-imprint resist (SOG) was coated to form the resist mask layer 6. A thickness of the resist mask layer was set to 80 nm (FIG. 5A).

The patterning was conducted according to a nano-imprint method, a pitch of a track having a magnetic recording region width of 65 nm and a non-recording region width of 55 nm was set to 120 nm, and a thickness of a resist residual film of a pattern concave portion in which ions were to be implanted was set to 10 nm (FIG. 5B).

On the patterned magnetic disk, an ion beam was illuminated to implant ions (FIG. 5C). At the ion implantation, 1E14 atoms/$cm^2$ of Ar ions were implanted at 17 KeV.

Thereafter, an ion-implanted magnetic disk was immersed in a KOH-containing solution for 30 minutes to remove the resist mask layer (FIG. 5D).

Further thereafter, a protective layer (3 nm) (not shown in the drawing) was deposited by a CVD method and a lubrication layer (1 nm) (not shown in the drawing) made of PFP was deposited according to a Dip method.

Finally, it was confirmed by X-ray that the FePt layer of the magnetic recording layer is rendered to an ordered alloy, and, in the non-recording region (ion-implanted portion), the regularity is deteriorated.

Figure 7:
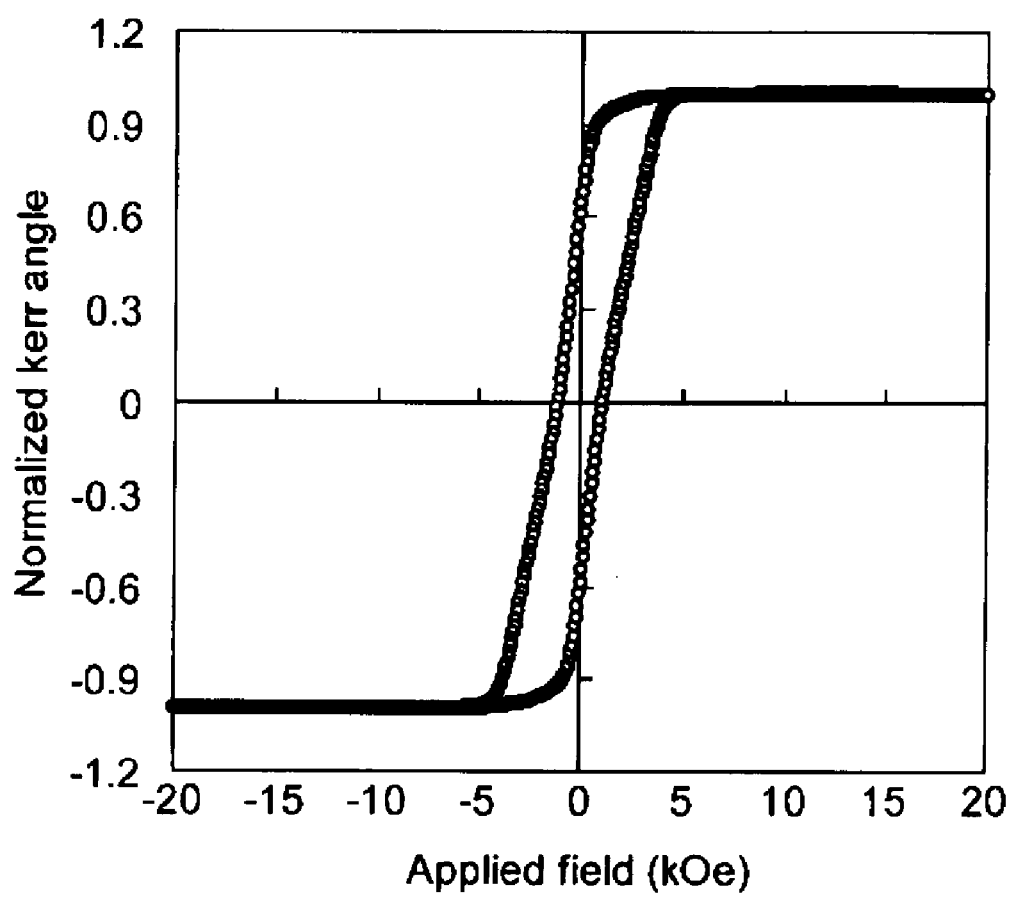
FIG. 7 is a diagram illustrating a magnetization curve after ion implantation in an example of the invention.

As is shown by a magnetization curve of FIG. 6, Hc of the magnetic recording region of the medium was 6200 Oe. The value was confirmed with the medium before ion illumination. When ions were illuminated on an entire surface of the medium to investigate an influence on the magnetization curve owing to ion illumination, the magnetization curve varied to lower the Hc to about 1000 Oe as illustrated in FIG. 7. This corresponds to a magnetization curve of an actual non-recording region (portion where ions were implanted). When ions are illuminated on the medium, the magnetization curve varies to lower the Hc to about 1000 Oe as shown in FIG. 7. As for energy when ions are illuminated, a penetration depth thereof can be calculated according to a Monte Carlo method with illuminating ion species (Ar ions in this case) and a target magnetic medium material. Thereby, energy at which ions are implanted into an entirety of the FePt layer was obtained (in this case, an acceleration voltage of ion was set to 17 KeV). Herein, the ion species is not restricted to Ar and any ion species may be used as long as it can effectively improve the magnetism. For example, P, O, N, C, B, H and also ions of metals such as Co, W, Si, Ga and Pt are effective. A valence may be monovalent or bivalent as long as it can improve the magnetism. An illumination dose of ions was set to $1\times10^{14}$ atoms/cm$^2$ in the Example. However, in the case when a sufficient effect is obtained, the dose amount may be less than that value.

Figure 8:
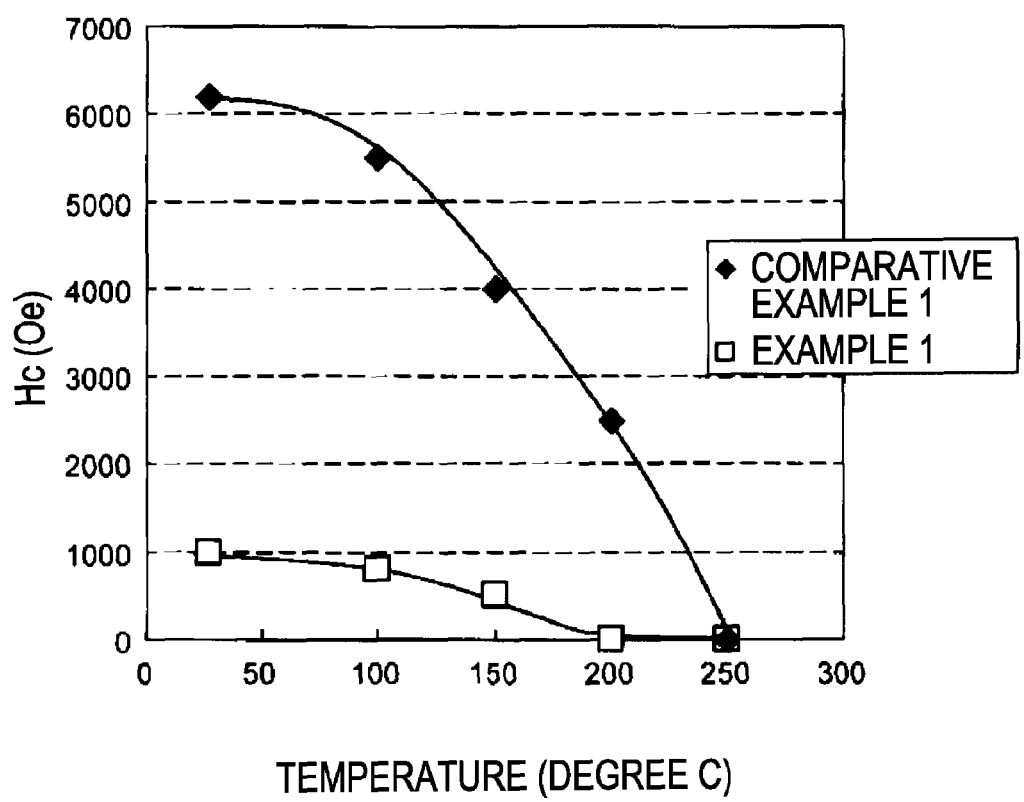
FIG. 8 is a diagram illustrating temperature dependency of the coercive force (Hc) in an example of the invention.

In order to compare the Tc (Curie temperature) of the media, the temperature dependency of Hc was measured, and results are shown in FIG. 8. Thus, in an existing magnetic medium of Comparative Example 1, even when a temperature is raised to about 200° C., the Hc can be reduced by about 4000 Oe, but, the paramagnetism is not obtained. Herein, in a medium underwent ion-illumination according to the invention, when a temperature is raised to about 200° C., the Hc becomes almost zero so that the Hc can be lowered by more than 6000 Oe, and furthermore, since the Tc is exceeded as illustrated in Example 1, it is found that the paramagnetism is obtained.

In the next place, a method of preparing a groove that separates tracks of a DTM and a bit of BPM by ion illumination will be described. When the groove of the DTM and the bit of the BPM are prepared by ion illumination, a fine pattern has to be formed to shield ions. In the Example, the SOG resist that is difficult to generate shape collapse by ion illumination was used. Although the SOG resist was used here, a resin resist or a metal mask may be separately formed on the magnetic layer to shield ions. Not a contacted mask but a non-contact mask pattern such as a membrane mask or a stencil mask may be used.

In essence, a pattern forming method owing to ion illumination where a patterned portion that shielded ions may be a recording layer, and a portion where ions penetrated to improve the magnetic layer may be a non-recording portion may be used. With the track width set to 120 nm and the groove width set to 80 nm, ion illumination was conducted to prepare a magnetic pattern. After the magnetic track was formed by the ion illumination, the resist was removed, and the protective film and the lubrication agent were coated to form a surface state necessary for levitation at a levitation head necessary for a HDD. Herein, a levitation head for a HDD where a levitation amount is very low such as several nanometers from a disk surface was levitated on a medium surface, thereby it was confirmed that there is no problem in the levitation characteristics.

Figure 9:
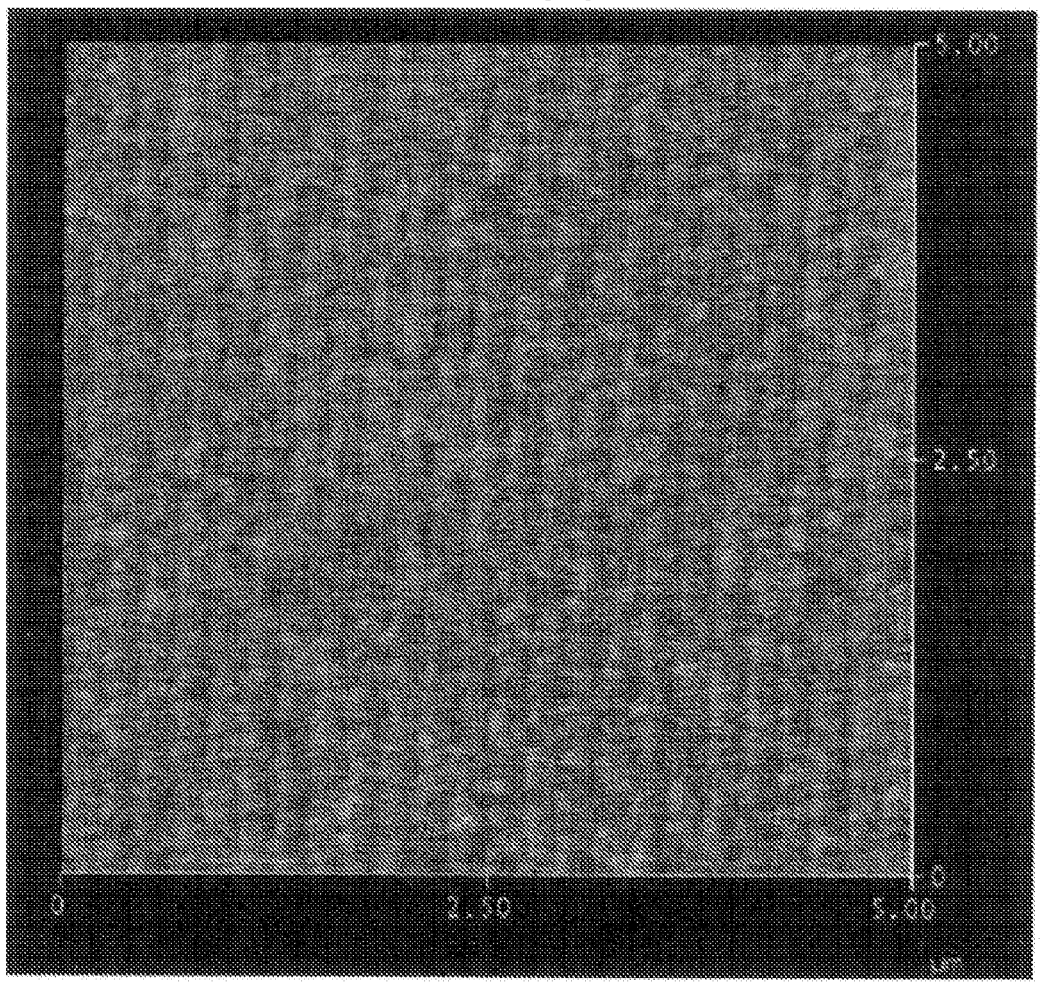
FIG. 9 is a diagram illustrating an MFM image when magnetic recording is conducted at room temperature in an example of the invention.
Figure 10:
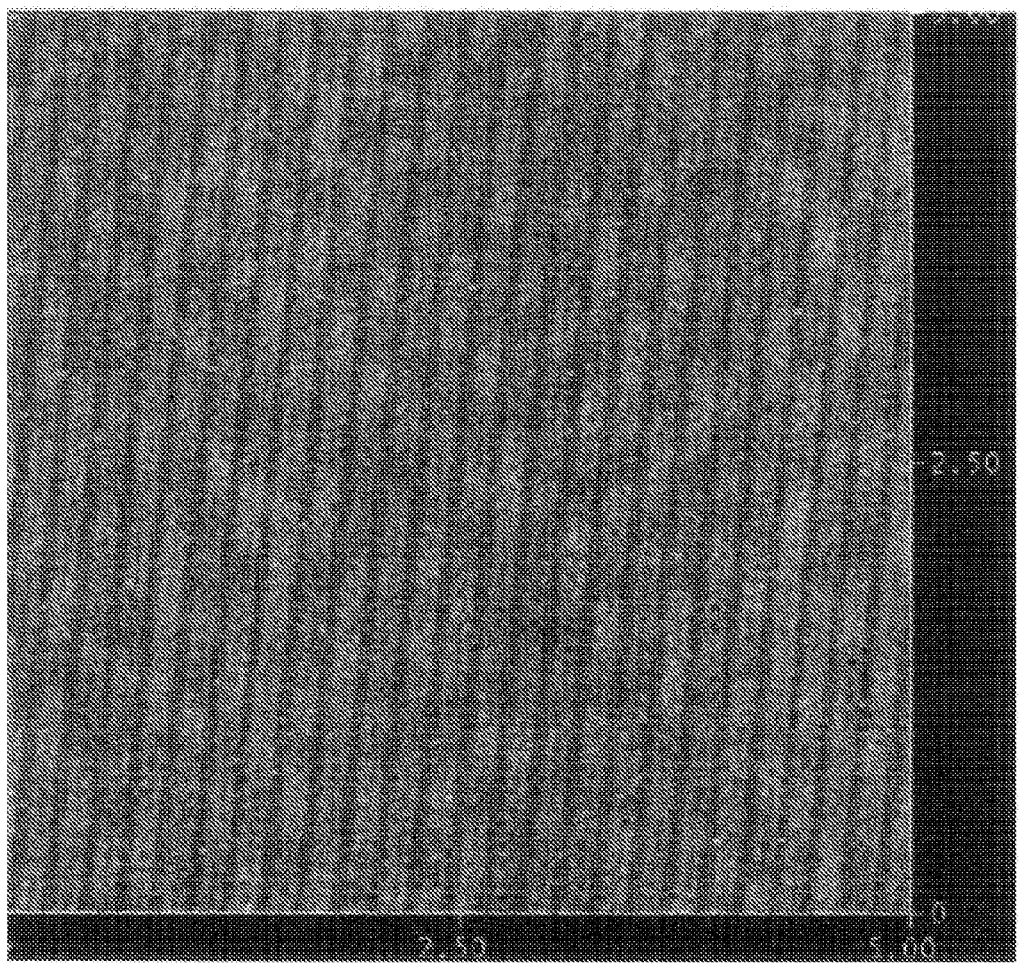
FIG. 10 is a diagram illustrating an MFM image when magnetic recording is conducted at 200° C. in an example of the invention.

Here, after external magnetization was applied in a vertical direction at room temperature to magnetize a medium, a magnetization state of the medium was observed with an MFM (magnetic force microscope). The result thereof is shown in FIG. 9. On the other hand, after a medium was heated up to 200° C. and magnetized in a vertical direction in a high temperature, a magnetization state was observed with the MFM, and the result thereof is shown in FIG. 10.

As shown in FIG. 9, separation of tracks is insufficient and obscure, and also the coercive force of the recording portion is high; accordingly, it is found that the saturation magnetization is insufficient. On the other hand, in FIG. 10 of Example, since a magnetic field is applied in a high temperature, the recording portion is sufficiently saturation magnetized, and since the non-recording portion is not magnetized, the contrast of the recording portion and the non-recording portion is very clear and it is found that the tracks are clearly separated. When a magnetic recording medium prepared according to the Example is used, a high contrast discrete track medium or a bit pattern medium, which is supplied to the thermally assisted recording for a HDD, can be supplied.

The invention can be utilized in a magnetic disk that records according to the thermally assisted method and an apparatus thereof. In particular, since information can be written-in at high precision and with high contrast in a magnetic recording region and a non-recording region, the invention can be applied to high density small size magnetic disks expected to be high in future demand.

What is claimed is:

1. A thermally assisted magnetic recording disk, comprising:
    a substrate;
    on at least one surface of the substrate, a magnetic recording layer in which a plurality of magnetic recording regions in the form of tracks for conducting read/write of magnetic information and a plurality of non-recording regions for magnetically separating the magnetic recording regions are regularly disposed in an in-plane direction of the substrate; and in the non-recording regions, one or more kinds of elements of B, P, Si, F, C, In, Bi, Kr, Ar, Xe, W, As, Ge, Mo, Sn, $N_2$, $O_2$, Ne, He and $H_2$ are disposed,
    wherein said magnetic recording regions are structured and made of materials such that a thermally assisted recording method is effective to record,
    wherein one or more kinds of elements of B, P, Si, F, C, In, Bi, Kr, Ar, Xe, W, As, Ge, Mo, Sn, $N_2$, $O_2$, Ne, He and $H_2$ disposed in the non-recording regions are elements implanted by ion illumination, and
    wherein the coercive force (Hc) in the non-magnetic regions is less than 1000 Oe at temperatures between room temperature and 250° C.

2. The thermally assisted magnetic recording disk according to claim 1, wherein a Curie temperature (Tcn) of the non-recording regions and a Curie temperature (Tcr) of the recording regions satisfy a relationship of Tcn<Tcr.

3. The thermally assisted magnetic recording disk according to claim 2, wherein a magnetic anisotropy constant in the magnetic recording regions is $5\times10^6$ or more.

4. The thermally assisted magnetic recording disk according to claim 3, wherein the magnetic recording layer contains an FePt alloy layer.

5. The thermally assisted magnetic recording disk according to claim 2, wherein the magnetic recording layer contains an FePt alloy layer.

6. The thermally assisted magnetic recording disk according to claim 1, wherein a magnetic anisotropy constant in the magnetic recording regions is $5\times10^6$ or more.

7. The thermally assisted magnetic recording disk according to claim 6, wherein the magnetic recording layer contains an FePt alloy layer.

8. The thermally assisted magnetic recording disk according to claim 1, wherein the magnetic recording layer contains an FePt alloy layer.

9. A thermally assisted magnetic recording disk, comprising:

a substrate;

on at least one surface of the substrate, a magnetic recording layer in which a plurality of magnetic recording regions in the form of tracks for conducting read/write of magnetic information and a plurality of non-recording regions for magnetically separating the magnetic recording regions are regularly disposed in an in-plane direction of the substrate; and in the non-recording regions, one or more kinds of elements of B, P, Si, F, C, In, Bi, Kr, Ar, Xe, W, As, Ge, Mo, Sn, $N_2$ $O_2$, Ne, He and $H_2$ are disposed, wherein said magnetic recording regions are structured and made of materials such that a thermally assisted recording method is effective to record, wherein one or more kinds of elements of B, P, Si, F, C, In, Bi, Kr, Ar, Xe, W, As, Ge, Mo, Sn, $N_2$ $O_2$, Ne, He and $H_2$ disposed in the non-recording regions are elements implanted by ion illumination, and wherein when a temperature is raised to about 200° C., a value of Hc in the non-magnetic regions becomes almost zero.

10. The thermally assisted magnetic recording disk according to claim 9, wherein a Curie temperature (Tcn) of the non-recording regions and a Curie temperature (Tcr) of the recording regions satisfy a relationship of Tcn<Tcr.

11. The thermally assisted magnetic recording disk according to claim 10, wherein a magnetic anisotropy constant in the magnetic recording regions is $5\times10^6$ or more.

12. The thermally assisted magnetic recording disk according to claim 11, wherein the magnetic recording layer contains an FePt alloy layer.

13. The thermally assisted magnetic recording disk according to claim 9, wherein a magnetic anisotropy constant in the magnetic recording regions is $5\times10^6$ or more.

14. The thermally assisted magnetic recording disk according to claim 13, wherein the magnetic recording layer contains an FePt alloy layer.

15. The thermally assisted magnetic recording disk according to claim 9, wherein the magnetic recording layer contains an FePt alloy layer.

* * * * *